Figures 1, 2:
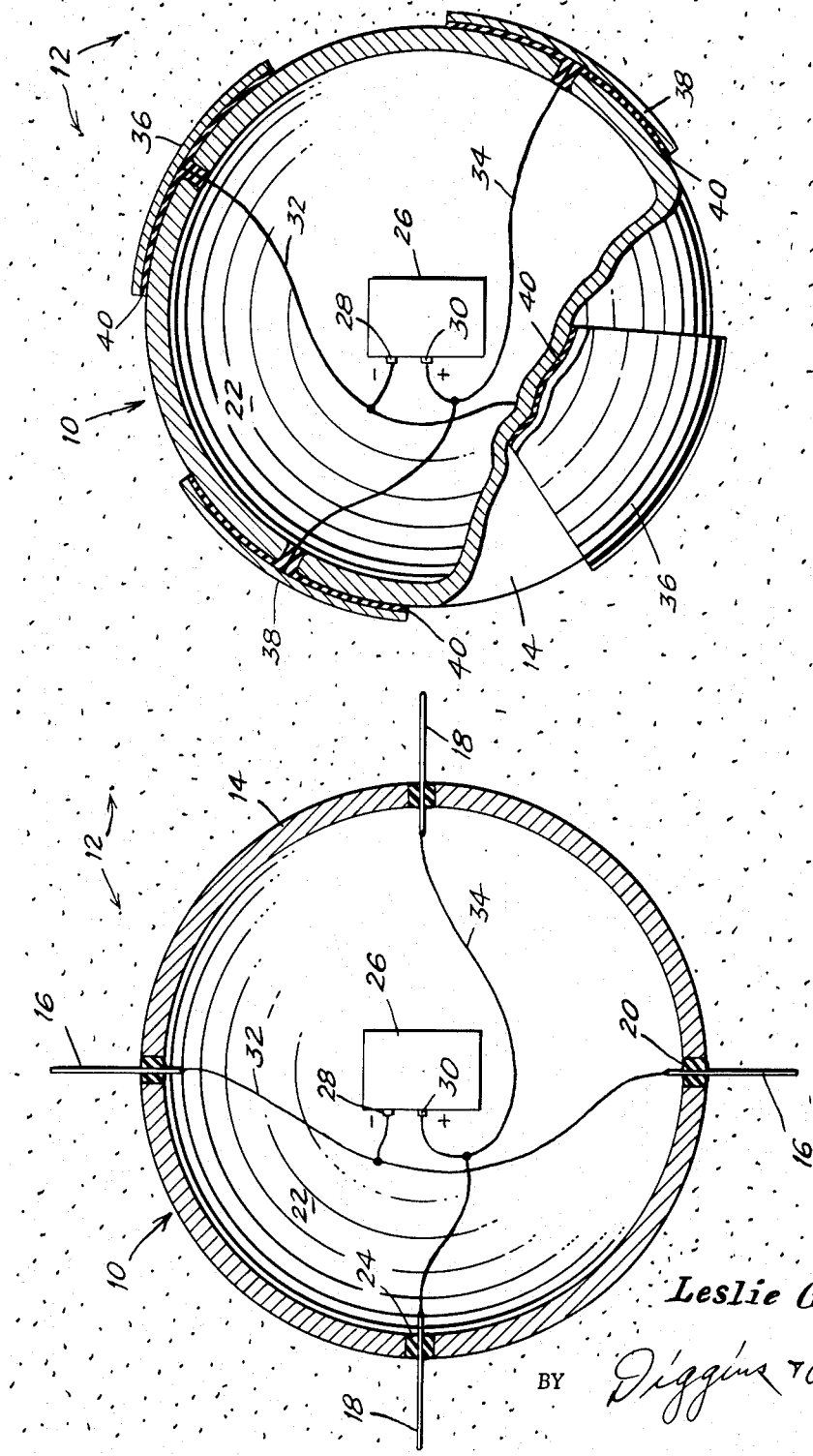

Sept. 7, 1965  L. G. SMITH  3,205,381
IONOSPHERIC BATTERY
Filed March 9, 1962

INVENTOR
Leslie G. Smith,
BY Diggins & Le Blanc
ATTORNEYS

United States Patent Office 3,205,381
Patented Sept. 7, 1965

3,205,381
IONOSPHERIC BATTERY
Leslie G. Smith, Waltham, Mass., assignor, by mesne assignments, to the United States of America as represented by the Administrator of the National Aeronautics and Space Administration
Filed Mar. 9, 1962, Ser. No. 178,721
11 Claims. (Cl. 310—5)

This invention relates to a method and apparatus for tapping the enormous reservoir of energy existing in the ionosphere and more particularly for furnishing electrical power to space vehicles.

Within recent years various space probes and space vehicles such as satellites have been launched by man in an effort to learn more about the earth and the solar system within which he lives. Each of these various space craft has employed numerous electrical circuits which are utilized to detect and transmit back to earth certain information ascertained by the craft as it moves through space. In view of the presence of such electrical circuits, some source of electrical power must be made available whereby these circuits can be energized. In the past there have been three main sources of electrical power carried by space vehicles for energizing these circuits, namely, (1) conventional storage batteries, (2) solar batteries and (3) a combination of the conventional storage and solar batteries. Although these various electrical power sources have functioned with some degree of success each has certain serious limitations which cannot be readily overcome.

In the first instance, the conventional storage battery may be of either the wet or dry type but, due to its superior storage capacity, the wet cell type is used nearly exclusively in space vehicles. This additional storage capacity of the wet cell battery is of great importance since the useful life of the vehicle is usually dependent upon the proper operation of its electrical circuits which are, in turn, directly dependent upon the capacity and life of the available power source. Use in space vehicles of a storage battery that utilizes a liquid electrolyte presents several problems that have not been completely solved, however, nor is there any apparent solution to some of these problems. For example, to increase the output capacity of the battery and thereby extend the useful life of the satellite a greater amount of electrolyte must be carried by the battery. But to increase the quantity of electrolyte carried by the battery results in both an increase in size and weight of the power source and space vehicle which cannot, in most instances, be tolerated. Furthermore, the electrolyte may not function correctly if it is subjected to the extreme conditions of space such as, for example, the changes in temperature that are normally encountered. Thus, to insure the proper operation of the wet cell battery involved in powering a space vehicle and to prevent any leakage that might occur should the battery be damaged, some shielding or insulating of the battery is usually involved which, needless to say, adds materially to the cost and weight of the vehicle.

To overcome the space, weight and leakage problems encountered when storage batteries of the conventional wet cell type are used, space engineers have turned to the recently developed solar cell or battery which converts the light rays received from the sun directly into electrical energy. While these solar batteries do not require any type of electroylte and are, therefore, relatively light in comparison to the wet cell storage battery, they are expensive and their inherent principle of operation presents one problem which cannot be overcome, namely, the inability of the solar cell to produce power while the space vehicle is shaded from the sun such as occurs when a satellite is in the shadow cast by the earth.

In an effort to overcome this loss of power which occurs each time a satellite passes into the shadow cast by the earth or some other heavenly body, a storage battery of the wet cell type was added to the vehicle. While the satellite is in the sunlight the solar battery powers the various electrical circuits and charges the storage battery so that, once the sunlight is no longer available, the storage battery can be switched on to furnish the necessary electrical power to the vehicle. While this combined system functions satisfactorily, there is added to the already existing problems of weight, size and electrolyte leakage the problem of incorporating a battery charging and switch-over system between the solar and storage batteries. The addition of this type of system to the power source is undesirable since it adds unduly to the complexity, sensitivity and cost of the space vehicle.

According to the present invention, it has been found that some of the foregoing disadvantages of space vehicle power sources can be overcome by employing an ionospheric type battery which utilizes the ionosphere or other ionized medium existing in outer space as a supplemental source of energy. Since power is a scarce commodity essential for the operation of the space vehicle and for the proper functioning of its experiments, any means for supplying additional power while adding only slightly to the weight of the vehicle, increases the efficiency and life of the space vehicle. Although it has been known for some time that the ionosphere contains an enormous reservoir of energy in the form of excited and ionized atoms and molecules, no practical method has heretofore been found whereby this energy could be utilized as a source of power for earth satellites even though much thought has been given to this problem. The operation of the present invention is based upon the discovery that the ionosphere can be utilized as a part of supplemental power source for the load circuit in a space vehicle when said vehicle is equipped with electrodes having different work functions which, in turn, are electrically connected through the load circuit.

Accordingly, a primary object of this invention is to provide a method of producing electrical power from ionized media existing in nature.

Another object of this invention is to provide a simple, highly reliable supplemental power source for space vehicles.

Yet another object of this invention is to provide an ionospheric battery for use by satellites.

Still another object of this invention is to provide an ionospheric battery which utilizes the ionosphere as an electrolyte.

A further object of this invention is to provide a supplemental power source for space vehicles that will operate when shielded from the sun.

Yet a further object of this invention is to provide a power source for a satellite that is light and inexpensive to produce.

Another object of this invention is to provide a satellite with various shaped electrodes constructed of metals having different contact potentials.

These and further objects and advantages of this invention will become more apparent upon reference to the following description, claims and the appended drawings wherein:

FIGURE 1 is a cross sectional view of an orbiting satellite equipped with a power source constructed in accordance with one embodiment of the present invention; and FIGURE 2 is a view in partial section of an orbiting satellite equipped with a power source constructed in accordance with a second embodiment of the present invention.

With continuing reference to the accompanying drawings wherein like reference numerals designate similar parts throughout the various views, and with initial attention directed to the embodiment of FIGURE 1, reference numeral 10 is used to generally designate a space satellite which is orbiting or otherwise passing through an ionized layer or medium such as, for example, the ionosphere which surrounds the earth. As is well known, the ionosphere contains an enormous number of excited and ionized atoms and molecules which are generated or produced when the gasses surrounding the earth are subjected to bombardment by high energy particles and rays such as, for example, ultra-violet or cosmic rays that originate throughout the solar system. Although these various ionized particles created by this bombardment are invisible to the eye they are represented pictorially by the various dots 12 for purposes of clarity.

The satellite 10 consists of an envelope or outer skin surface 14 which may be constructed of metal, ceramic or any other like material which is suitable for space vehicles of this type. As seen in FIGURE 1, a plurality of electrically conductive electrodes 16-18, which are shown in the form of rods and are constructed of materials having different contact potentials (work functions), are mounted in a spaced relationship in the medium 12 through apertures 20 in the envelope 14 of the satellite. In order to prevent a leak from occurring between the normally pressurized interior 22 of the satellite and the ionosphere, which is a near vacuum, and to insulate the electrodes in case a metal is used for the envelope 14, vacuum tight insulator feed-through elements 24 are fitted around the electrodes 16-18 and are securely mounted within the aperture 20. These feed-through elements may be of any suitable type so long as they are constructed to withstand the changes in environmental conditions encountered in space without losing their insulative and sealing qualities.

Carried within the cavity or interior 22 of the satellite 10 is a load circuit 26 which may be, for example, a transmitter or any other electrical device that requires a source of electrical power for its proper operation. The load circuit 26 is mounted to the interior wall of the satellite by suitable means (not shown) and has its positive and negative power input terminals 28-30 connected to the various electrodes 16-18 respectively, by suitable electrical conductors 32-34.

The overall principle and operation of the ionospheric battery in relationship to the satellite 10 can be explained substantially in the following manner. While the satellite remains on earth prior to its being hurled into or through an ionized medium, the electrodes 16-18 are at substantially the same potential since very few ionized particles are present. Thus, no current will flow through the load circuit 26. However, once the satelllite is launched and it enters an ionized medium a potential difference will be established between the electrodes 16-18 and an electrical current will begin to flow through the load circuit 26. This difference in electrical potential that exists between the electrodes 16-18 while the satellite is in an ionized medium is attributed to the fact that the electrodes 16 are constructed of a material having a different contact potential or work function from that of the electrodes 18. This difference in contact potential between the electrodes 16-18 will result in the free electrons of the ionized medium being collected on one group of electrodes, for example the electrodes 16, while the positive ions produced when the gas is ionized will be collected on the other electrodes 18. With the electrodes 16 charged to a negative potential in relationship to electrodes 18, a predetermined amount of current will flow through the load circuit 26 and can thus be utilized to power an electrical circuit such as the transmitter mentioned above.

The exact material from which the two types of electrodes 16 and 18 are constructed will depend upon several factors such as, for example, the amount of output power desired, the material readily available for constructing the electrodes, the susceptibility of the material to damage or destruction when exposed to the environmental conditions existing in space, and various other considerations that will be readily apparent to a worker in the battery field.

While the electrodes 16-18 used in the ionospheric battery of FIGURE 1 have been described as rods or whip-like elements it is to be realized that the electrodes may take other shapes. By way of example, a plurality of flat, plate-like electrodes 36-38 are shown mounted on a satellite in FIGURE 2. These electrodes are constructed of materials having different contact potentials and are insulated from the outer surface 14 of the satellite when this is necessary by an insulative layer 40 of any suitable material having the desired insulative properties under the severe conditions existing in space. The use of these plate electrodes 36-38 has the advantage of increasing the surface area exposed to the ionized medium thus permitting a larger output current to be produced without the necessity of using excessively long electrodes as might be the case if the rod electrodes of FIGURE 1 were used.

The output current of the battery is dependent upon the degree to which the medium is ionized and to the extent that the electrode surface area is exposed to the medium. An increase in either results in an increase in the efficiency of the battery. From an analysis of various experiments it is expected that a current of about two microamps per cm.$^2$ of electrode surface at a potential of one volt would be produced if the satellite is orbiting in the ionosphere at an altitude of approximately 350 km. and electrodes of gold and platinum are used.

It will also be readily apparent that the envelope of the satellite itself could be constructed in sectional form and of materials having different contact potential thus eliminating the necessity of attaching different electrodes to the satellite or the slight increase in weight necessarily involved. Of course the various sections of material making up the envelope of the satellite would have to be insulated from one another to prevent electrical shorting from occurring.

It will be apparent from the foregoing that the power source of this invention is extremely light, rugged and involves a minimum of cost to construct. By using the vast natural reservoir of energy existing in the form of ionized gases for producing the electrical power necessary to energize the various electrical circuits of a space vehicle a practically indefinite source of electrical power is made available to the vehicle. An ionospheric battery constructed in accordance with this invention is also much more reliable in operation than other heretofore known power sources since no liquid electrolyte is involved which can leak, deteriorate or otherwise become spent, nor is the operation of the battery dependent upon its position in relationship to a source of light.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A space vehicle equipped with a generator of electrical energy operable in the ionosphere as a supplemental source of potential for a load thereof, said generator comprising at least two electrode means on said vehicle and positioned to contact said ionosphere when said vehicle is in said ionosphere, said two electrode means each having different contact potentials, one of said two electrode means being gold and the other being platinum, and electrical connector means connecting said two electrode means to said load.

2. Apparatus for generating electrical energy from the ionosphere comprising, a pair of spaced electrode means having different contact potentials positioned to contact said ionosphere so that a direct-current electric potential is established between said electrode means, load circuit means, and means electrically connecting said load circuit means to said electrode means whereby said load circuit means is powered by the direct-current electrical potential existing between said electrodes.

3. Apparatus for generating electrical energy from the ionosphere comprising, carrier means, a first electrode having a first contact potential mounted on said carrier means, a second electrode having a second contact potential spaced from said first electrode and mounted on said carrier means, said first and second electrodes being positioned on said carrier means so that they will be in contact with said ionosphere when said apparatus is placed in the ionosphere so that a direct-current electric potential is established between said first and second electrodes, and an electrical load circuit connected between said first and second electrodes, said load circuit being powered by the direct-current potential produced by said first and second electrodes.

4. Apparatus according to claim 3 wherein said first and second electrodes extend away from said carrier means.

5. Apparatus according to claim 3 wherein said first and second electrodes form a portion of said carrier means.

6. In a space vehicle adapted to pass through ionized areas in space, a power source for said vehicle while it is passing through said ionized areas comprising, a plurality of electrode means located on the outer surface of said vehicle, said electrode means being constructed of materials having different contact potentials, and means connecting said electrode means together through a load circuit whereby said circuit receives a source of direct-current as said space vehicle passes through said ionized areas.

7. In a space vehicle according to claim 6 wherein said electrode means are rod shaped.

8. In a space vehicle according to claim 6 wherein said electrode means are plate shaped.

9. A satellite comprising an envelope, electrical load means carried in said envelope, apertures extending through said envelope at spaced points, electrode means having different contact potentials, said electrode means passing through said apertures, means in said aperture for insulating said electrode means from said envelope, and electrical conductor means connected between said electrode means and said electrical load means whereby said electrical load means is energized by the direct-current electric potential established when said electrode means passes through an ionized medium.

10. A space satellite comprising an envelope, an electrical load circuit carried in said envelope, a power supply for said electrical load circuit comprising a first electrode having a first contact potential connected to said electrical load circuit and extending through said envelope and a second electrode having a second contact potential connected to said electrical load circuit and extending through said envelope, said first and second electrodes being insulated from one another so that said electrical load circuit is powered by the direct-current electric potential established by said first and second electrodes coming in contact with an ionized medium.

11. The method of powering electrical circuit means carried by a space vehicle comprising the steps of positioning first and second electrode means having different work functions on said vehicle, passing said vehicle through the ionosphere so that said first and second electrode means are in contact therewith and produce a direct-current potential between them, and connecting said first and second electrodes to said electrical circuit means by means of electrical connector means, whereby said direct-current potential is made available for operating said circuit.

References Cited by the Examiner

UNITED STATES PATENTS

| | | | |
|---|---|---|---|
| 414,943 | 11/89 | Dewey | 310—5 X |
| 911,260 | 2/09 | Pennock | 310—5 X |
| 2,303,321 | 12/42 | Bennett | 175—264 |
| 2,445,305 | 7/48 | Hochgesaug | 250—83.6 |
| 2,510,397 | 6/50 | Hansell | 171—330 |
| 2,802,113 | 8/57 | Ohmart | 250—83.6 |
| 2,864,012 | 12/58 | Thomas | 310—3 |
| 2,900,535 | 8/59 | Thomas | 310—3 |
| 3,021,472 | 2/62 | Hernqvist | 322—2 |

LLOYD McCOLLUM, *Primary Examiner.*

JOHN H. MACK, *Examiner.*